United States Patent [19]

Smith et al.

[11] 4,174,807

[45] Nov. 20, 1979

[54] AUTOCYCLING CONTROL CIRCUIT FOR HEATING AND/OR AIR CONDITIONING SYSTEMS

[76] Inventors: Arthur W. Smith, 4 Dempsey Ct., Ansonia; George D. Kimble, Curtis Ave., New Fairfield, both of Conn. 06401

[21] Appl. No.: 932,422

[22] Filed: Aug. 10, 1978

[51] Int. Cl.² ............................................. F23N 5/20
[52] U.S. Cl. ...................................... 236/47; 165/12; 236/94
[58] Field of Search ............... 236/46 R, 47; 219/492; 165/12; 307/141; 337/301–303

[56] References Cited

U.S. PATENT DOCUMENTS

| | | | |
|---|---|---|---|
| 3,317,692 | 5/1967 | Duncan | 337/301 |
| 3,964,676 | 6/1976 | Rooks et al. | 236/47 X |
| 3,979,059 | 9/1976 | Davis et al. | 236/91 G |
| 4,102,495 | 7/1978 | Flynn et al. | 236/46 R |

*Primary Examiner*—William E. Wayner
*Attorney, Agent, or Firm*—Parmelee, Johnson, Bollinger & Bramblett

[57] ABSTRACT

An autocycling control circuit unit is provided for controlling heating and/or airconditioning systems to provide controlled comfort and fuel savings. The unit contains a night thermostat which is continually coupled to the system for maintaining a minimum temperature level. A programmable timer enables and disables a day thermostat during settable, predetermined time intervals. The timer includes a feedback circuit for varying the on-off cycling of the day thermostat, after initial warm-up, in accordance with the rate at which the day thermostat calls for heat. The unit contains a backup battery and charger to insure the proper timing sequence in the event of system power outages.

10 Claims, 3 Drawing Figures

AUTOCYCLING CONTROL CIRCUIT FOR HEATING AND/OR AIR CONDITIONING SYSTEMS

BACKGROUND OF THE INVENTION

This invention relates to an electronic control circuit for use in heating and/or airconditioning systems of residences and buildings, and more particularly to an improved programmable, automatic-cycling control circuit for controlling the operation of heating and/or airconditioning systems.

In U.S. Pat. No. 4,049,193 entitled "Systems and Apparatus for Control of Fueled Heat Generators," apparatus and systems are disclosed for the control of heat generators during time intervals which are readily changeable by varying the settings of a plurality of switches by the user. A digital clock was provided for generating output signals indicative of the elapsed time of day, and control signals were generated in accordance with the switch settings set by the user of the desired times of day for the control of the system. Both night and day thermostats were employed, and were set to operate during predetermined time intervals in accordance with the desires of the user. Once the various time intervals were set, there was no provision for automatically adjusting the on-off timer of the thermostat in accordance with environmental conditions such as the rate of heating and cooling of a room which the thermostat was monitoring. In using such a system, the only way to adjust the on-off timer was by resetting the switches. For example, if the night thermostat was controlling until 7 a.m. and the day thermostat was switched on for a predetermined warm-up interval, once the interval was set, the thermostat would continue to operate until the temperature of the room was brought up to the level set on the thermostat, and probably a little more for "overshoot." The next mode of operation change would not occur until the warm-up period mode was completed. The only way to change the warm-up period would be to change the time interval for warm-up. Since the required warm-up period times change during the season, the period may be too long in the warmer weather, and too short in the colder weather, thus not supplying enough heat. Accordingly, seasonal adjustment is required under the system of the aforesaid patent.

Another problem with the aforesaid system is that a loss of line voltage shuts the system down, and the time sequences set in the electronic clock must be reset when the power goes back on in order that the heating system which is being controlled is enabled and disabled at the proper times. Another problem with the aforesaid system is the size, complexity and cost of the control unit. Another problem with the aforesaid system is that primary power, additional to and separate from the thermostat lines, was required to power the unit. This increased both the cost and time to install the system.

SUMMARY OF THE INVENTION

Accordingly, it is an object of this invention to provide a new and improved control unit for use in controlling heating and/or airconditioning systems.

A further object of this invention is to provide a new and improved automatic cycling control system which is easy to operate, smaller in size, and less expensive than prior art systems.

Still another object of this invention is to provide an improved control system for heating and airconditioning systems which provides better control and more fuel savings for the operation of such systems.

Another object of the present invention is to provide an improved control unit for the control of heating systems which does not lose the timing sequence of the control function because of primary power outages.

In achieving these and other objects and in carrying out this invention in one illustrative embodiment thereof, an automatic cycling control circuit means is coupled to a heating and/or airconditioning system for the automatic control of such system. The control unit includes first and second thermostat means, one of which is set at a lower temperature and is continuously coupled to the system for maintaining a minimum temperature in accordance with its setting. A programmable timer means is provided for selectively controlling the coupling of the other thermostat to the heating system during settable predetermined time intervals. The programmable timer includes a control means for selectively enabling and disabling the control thermostat during the predetermined time intervals in accordance with the rate at which the thermostat is calling for heat. Among other features in the control unit are a standby battery and charging circuit therefor to prevent loss of the timing sequences during line voltage outages.

DESCRIPTION OF THE PREFERRED EMBODIMENT

In the following description, the autocycling control circuit unit or means in accordance with the present invention will be described and claimed in connection with the control of a heating system; however, it should be appreciated by those skilled in the art that the invention is not limited thereto, and contemplates controlling heating and/or airconditioning systems which use thermostatic controls for regulating temperature in residences and buildings in accordance with the present invention.

Figure 1:
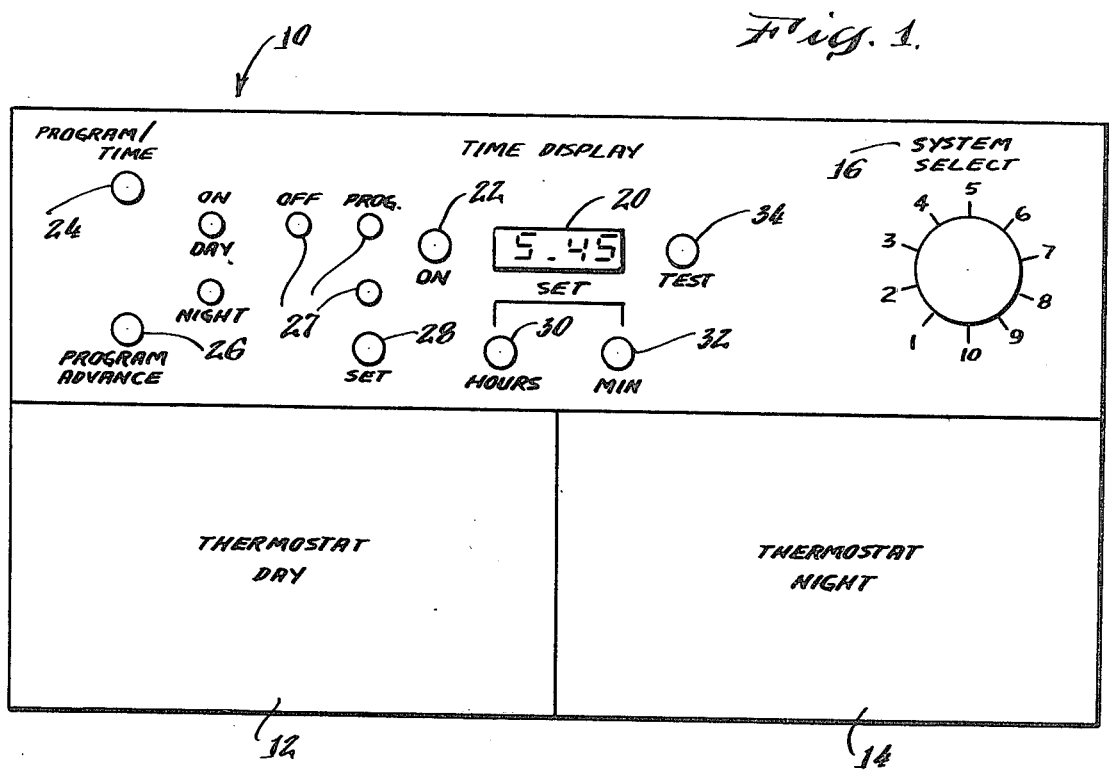
FIG. 1 is a front elevational view of the autocycling control circuit unit of the present invention.

FIG. 1 shows a control panel for the autocycling control circuit unit or means 10, which includes a pair of temperature-sensitive switch elements or thermostats designated day thermostat 12 and night thermostat 14. A system select control 16 is provided to adjust the unit 10 in accordance with the type of heating system employed, for example hot air, hot water, or steam, which have different heat-up or response times. A visual display 20 is provided along with a switch 22 for activating the display. A plurality of switches 24, 26, 28, 30, 32 and 34 are provided to allow the user to program and test the unit 10. A plurality of visual indicators 27 are also positioned on the panel to provide visual indications of the operating conditions of the unit. Programming of the unit 10 utilizing the front panel switches will be illustrated hereinafter.

Figure 2:
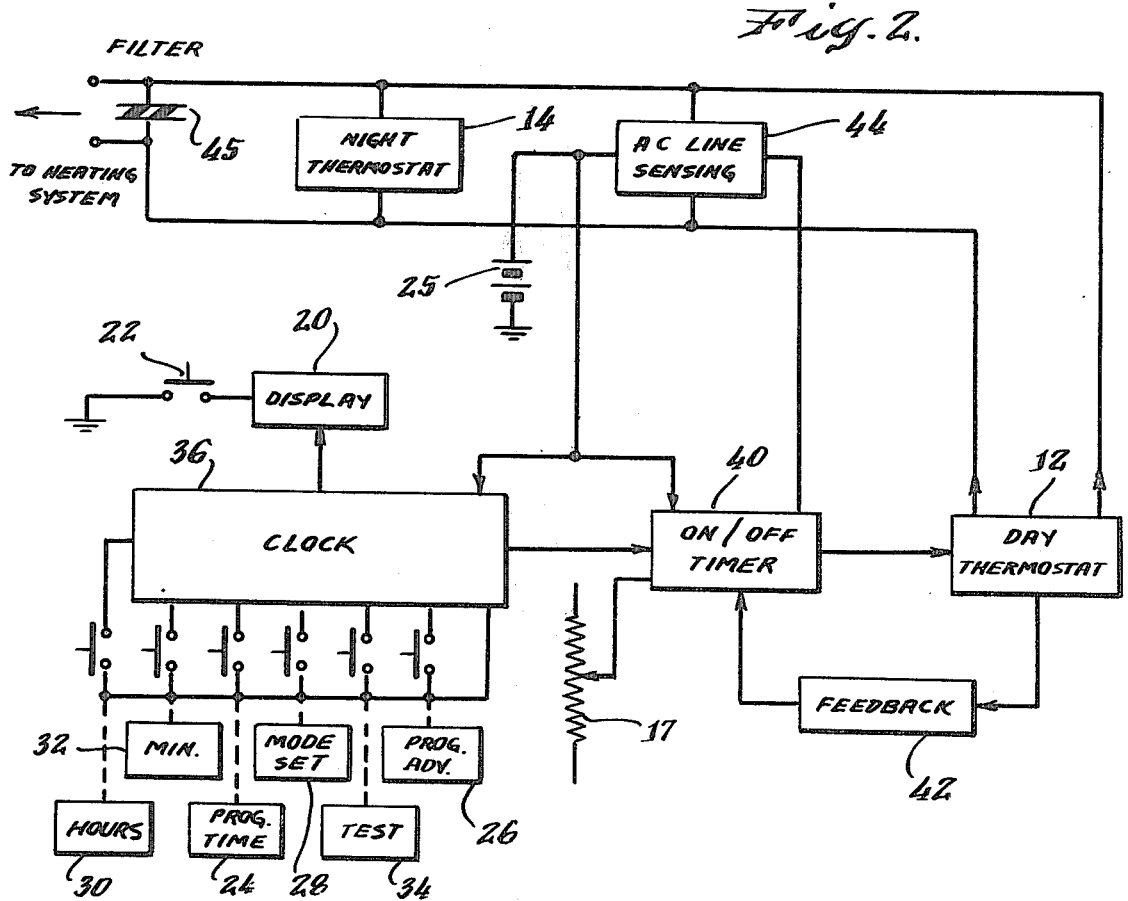
FIG. 2 is a simplified block diagram of the autocycling control circuit unit embodied in the present invention.

The basic elements of the unit 10, as is shown in the block diagram in FIG. 2, include a clock circuit 36, with the various operational switches 24, 26, 28, 30, 32 and 34. The clock output is coupled to the display 20 which may be activated by its associated switch 22. The clock also feeds an on-off timer 40 which is essentially a programmable oscillator for controlling the day thermostat 12 after an initial warm-up mode of the thermostat 12. A feedback circuit 42 is coupled between the day thermostat 12 and the on-off timer 40 which functions to permit the day thermostat 12 an initial warm-up period when it is first actuated, at which time the on-off timer 40 takes control, periodically enabling and disabling the day thermostat, the rate of switching being variable, and changeable by the feedback circuit 42 in accordance with the rate that the day thermostat calls for heat. The feedback path 42 consequently can vary the rate of the on-off timer in accordance with environmental conditions in the residence or building where the unit 10 is installed. The period of the on-off rate of the day thermostat may also be varied by a potentiometer 17 which is controlled by the system select control 16. The setting of the system select control 16 will depend on the type of heating or airconditioning system which is employed.

The day and night thermostats, 12 and 14 respectively, are coupled to the heating system to be controlled in parallel with a filter 45 which acts as a short circuit to high line voltage transients. Many heating and airconditioning systems are activated by various relays, solenoids, and switches which are inductive in character and generate large voltage transients when power is removed from the system, which happens every time a thermostat stops calling for heat. The filter 45 keeps such transients out of the unit 10 and stabilizes the operation of the unit. The night thermostat 14 is always connected to the heating system, which insures that a minimum temperature will be maintained as long as the heating system is in operation. Accordingly, even though the unit is not programmed, or an error in programming is made, or the power goes off of the system and then returns, the night thermostat 14 will be connected in circuit with the heating system and provide a temperature in accordance with that set by the night thermostat 14.

The unit 10 also contains a rechargeable nickel-cadmium battery 25 which has a recharging circuit not shown in the block diagram of FIG. 2. The battery 25 is coupled to the clock 36 and the on-off timer 40 and provides the important function of a stand-by voltage which is usable in case of power outages to the heating system. In such cases the battery will continue to provide power to the clock and the timer so that the sequence of the program is not lost when the power comes back on. For example, when the power is off for two hours, the program used in operating unit 10 would be off by two hours and would need to be completely reprogrammed. With the reserve battery which keeps the clock 36 running, the system will continue its normal sequence which has been programmed hereinto once power has been restored. The unit 10 also includes an AC line sensing circuit 44 which senses the fact that there are no AC line failures and that the thermostat line is active, and for other purposes which will be described hereinafter.

Figure 3:
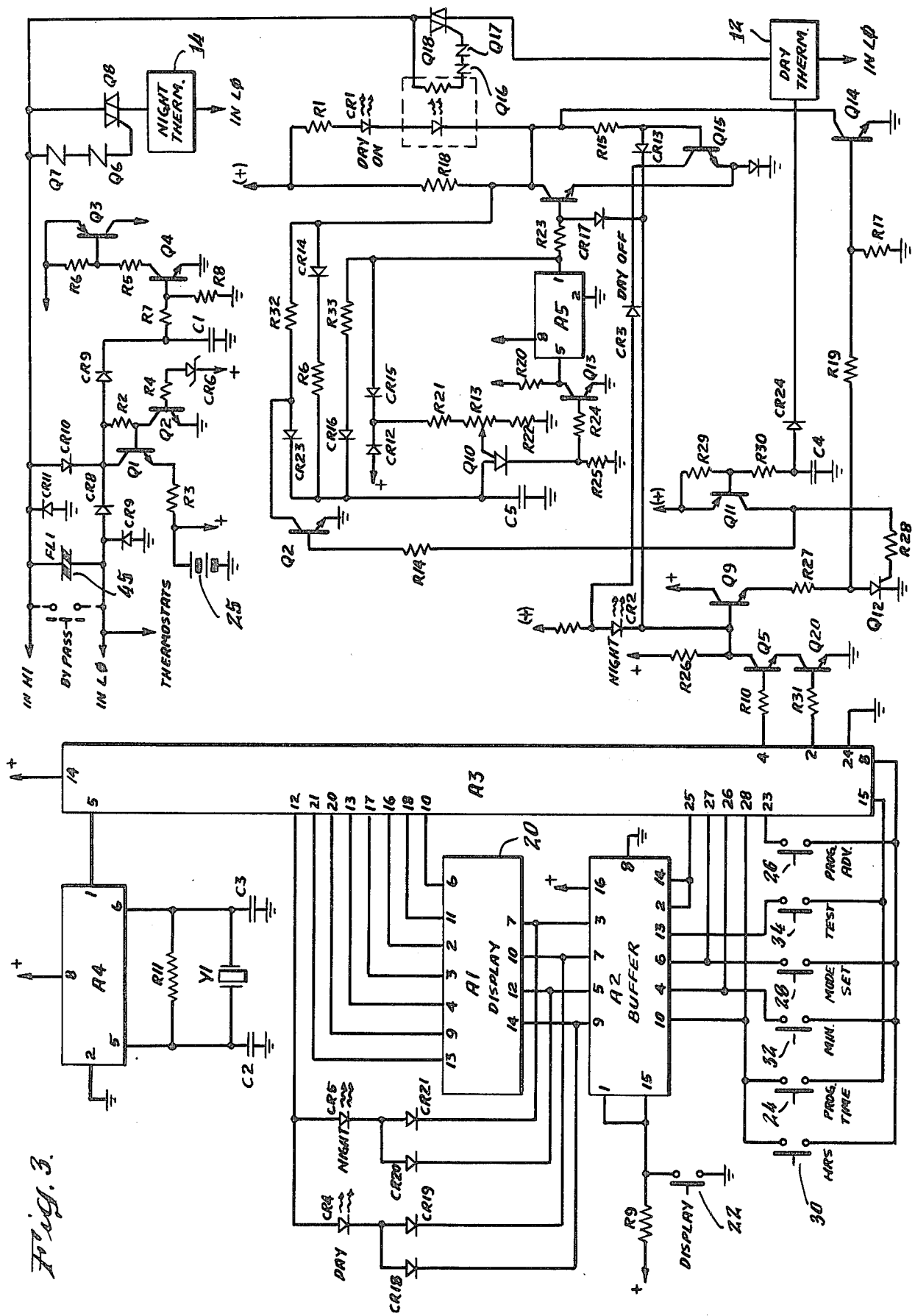
FIG. 3 is an electrical schematic diagram illustrating one form of carrying out the present invention.
Figure 3:
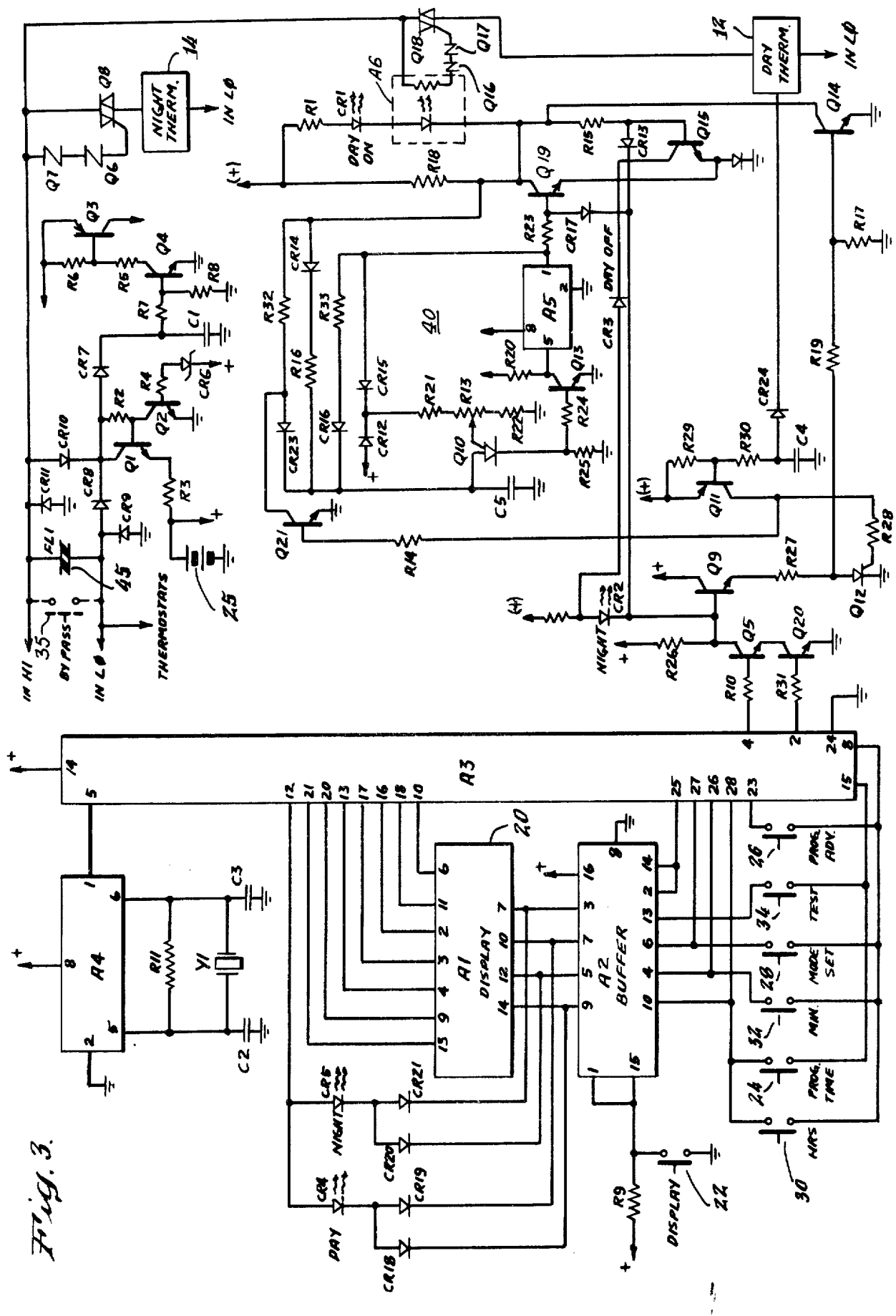

Referring now to FIG. 3, the clock circuit 36 illustrated in FIG. 2 includes a signal generator comprised of integrated circuit A4, resistor R11, crystal Y1, and capacitors C1 and C2, as well as a programmable microprocessor A3. The output of the signal generator is a 60-cycle rectangular waveform which appears at pin 1 of A4 and is applied to pin 5 of microprocessor A3. The microprocessor A3 is programmed and tested by the activation of switches 24, 26, 28, 30, 32 and 34 in a manner which will be described hereinafter. The microprocessor A3 stores the time of day, provides multiplex control signals to illuminate a 4-digit numeric display 20, and also provides control signals at programmed time-of-day intervals in accordance with the desires of the user. The numeric display 20 is actuated only on the depressing of its control switch 22, which enables a buffer amplifier A2, coupled to the display A1. The outputs of buffer A2 are in open circuit condition until its pins 1 and 15 are at 0 volts or ground level. When the buffer A2 is enabled, the outputs follow or repeat the inputs. As an alternative, a liquid crystal display may be employed which requires less power, thereby eliminating the need for the buffer circuit A2. Included in the display circuitry are a pair of light-emitting diodes (LED's) CR4 and CR5, which provide an indication of the day or night operational mode which will be activated in accordance with the programmed time appearing on the display 20. LED's CR4 and CR5 are only activated in the programming mode, and then only when the display pushbutton 22 is depressed.

The function of the feedback circuit 42 will now be described. It will be assumed that the microprocessor A3 has been preprogrammed to switch the system to the control of the day thermostat 12 for the first time in the program cycle. The day mode is initiated when either pin 2 or pin 4 of microprocessor A3 is switched low. Pins 2 and 4 are coupled by resistors R10 and R31 to the bases of a cascaded switch set Q5 and Q20. When either output on pin 2 or pin 4 is low, the cascaded switch set Q5 and Q20 are de-energized, which results in the collector of Q5 going high, which de-activates a night LED CR2 connected thereto. The output of the collector Q5 is buffered by an emitter-follower Q9 which is coupled thereto, which in turn is coupled via resistor R19 to the base of transistor switch Q14. The collector of Q14 is coupled to an LED circuit comprised of CR1 and A6. CR1 is a light-emitting diode which provides an indication that the day thermostat is on. For purposes of this explanation, the fact that a thermostat is considered on does not mean that it is necessarily calling for heat. It means that it is allowed to call for heat if room temperature is low enough. Element A6 is an opto-isolator consisting of a light-emitting diode and a photoresistor in a common sealed unit. When the light-emitting diode of A6 is activated, the photoresistor assumes a low value resistance of less than 2000 ohms, and when the light-emitting diode is deactivated, the photoresistor assumes a high value resistance in the order of megohms. The resistor of the opto-isolator A6 is connected in series with the gate drive of a triac switch Q18 which in turn is connected in series with the day thermostat 12. When the resistor of opto-isolator A6 is at a high resistance level, Q18 remains off, and the day thermostat 12 is unable to command the heating system to turn on. However, when opto-isolator A6 is activated, and the resistor at a low value, Q18 turns on whenever the day thermostat calls for heat, thus turning on the heating system. Two diacs Q16 and Q17 delay the activation of Q18 for a small portion of the AC control signal from the heating system. This action steals a small portion of the AC power to provide battery charging power as well as to provide information to the unit that there is no power loss to the system. The battery charging and AC sensing circuits will be described hereinafter. Accordingly, when a preprogrammed time signal appears at pins 2 or 4 of microprocessor A3, transistor switch Q14 is turned on, which activates the opto-isolator A6 and turns on Q18 to allow the day thermostat 12 to command heat. This condition remains until such time as the day thermostat 12 reaches the desired temperature, and is thus satisfied. This closes the normally closed contact of the day thermostat 12, which is sensed and peak-detected by CR24 and capacitor C4, which signal is applied via resistor R30 to the base of a transistor switch Q11. The output of transistor switch Q11 appearing at its collector is coupled to the gate of silicon control rectifier (SCR) Q12 which latches the SCR Q12 until such time as an unlatching signal is provided from a preprogrammed time applied to pins 2 and 4 of microprocessor A3. The latching of SCR Q12 disables transistor switch Q14 and in effect turns over control to the on-off timer circuit 40. Transistor switch Q11 also drives an inverter transistor 21 which either enables or disables resistor R32 in the on-off timer circuit 40, depending on whether the thermostat 12 is calling for heat or not, as will be explained hereinafter.

It will be appropriate to point out at this time an advantage of the feedback circuit which has just been described. Since the night thermostat 14 is set at a lower temperature, for example 10° F. lower than the day thermostat 12, the day thermostat will normally be calling for heat when the unit 10 switches from the night to the day mode. This initial heating cycle will last until the temperature set on the day thermostat is satisfied. If, on the other hand, a fixed initial cycle were provided, it would probably be too short on very cold days, and too long on warm days, which could compromise both comfort and fuel economy. With the use of the described feedback circuitry, the initial heating cycle is optimized when entering the day mode, regardless of the outside temperature.

The function of the on-off timer is to provide fuel economy by controlling the on-off cycle of the day thermostat 12, depending upon the environmental conditions and the type of heating system employed. In the normal functioning of a heating system, when the thermostat calls for heat, the heating system is activated, and heat is generated until the temperature of the thermostat is reached, at which time the thermostat is deactivated. However, when the thermostat is off on a satisfied condition, heat is still being generated—for example, steam or hot water are still in the radiator and pipes, and the areas served by these mechanisms are still being heated, causing overshoot. The on-off timer functions to change the time period of the heating curve, and ideally shuts the system down before overshoot occurs, thus more tightly controlling the system and conserving energy. In the illustrated embodiment of FIG. 3, the on-off timer 40 is basically a programmable unijunction (put) oscillator Q10 whose basic frequency of oscillation or on-off ratio (minimum to maximum) is controlled by a variable resistor R13 coupled to the gate electrode of Q10. Variable resistor R13 is set by system select control 16 on the front panel of the unit 10 in accordance with the type of heating system being utilized. The output of oscillator Q10 is sharpened and amplified by a transistor Q13 and then divided by an integrated circuit A5 by a factor of approximately 30,000. The relaxation oscillator Q10 may have a frequency which varies from as low as 42 to over 126 pulses per second, which when divided by approximately 30,000 in integrated circuit A5 gives an on-off cycle covering a maximum time span of approximately 50 minutes. When the output of integrated circuit A5 goes high at the battery potential level, the oscillator frequency is determined by resistor R33 and capacitor C5, which are coupled between the output of the integrated circuit A5 and the anode electrode of Q10. When the output of integrated circuit A5 is high, the output of an inverter transistor Q19 is low, which activates opto-isolator A6 and LED CR1, indicating that the day thermostat 12 is on. This condition represents the "on" period of the on-off timer 40, and permits control by the day thermostat 12. At the same time, an inverter transistor Q15 has a high output which deactivates the day-off LED CR3. After approximately 30,000 put oscillator cycles, the output of the integrated circuit A5 at pin 1 is switched low, transistor switch Q19 output goes high, and the put oscillator's basic frequency is determined by resistor R16 and capacitor C5, if the feedback circuit does not indicate that the day thermostat 12 is attempting to call for heat. If the thermostat is calling for heat, Q11 is turned off and Q21 is turned off with an open condition occurring at the junction of resistor R31 and diode CR23. This condition, in effect, places resistor R32 in parallel with resistor R16 to shorten the off period of the oscillator. This action allows a change of slope of the time cycle by the relaxation oscillator. With the output of inverter transistor Q19 high, LED CR1 and the opto-isolator circuit A6 are deactivated, the inverter transistor 15 output is low, and the LED CR3 is activated, which indicates that the thermostat 12 is off. Although environmental factors, the structure being heated, the heating system, and other factors may dictate other requirements, the initial setting will normally provide a 3:1 off-on ratio if the day thermostat 12 does not call for heat throughout the off period. However, it is assumed that the day thermostat will attempt to call for heat part of the way through the off period, which would alter the off-on ratio. The optimum comfort economy ratio is believed to be approximately a 2:1 off-on ratio, which is adjusted by a resistor R13 of the timer. The 2:1 off-on ratio is preferred when the outside temperature is at 32° F. If lower, the day thermostat 12 will call for heat sooner in the off period, reducing the off-on ratio, and when the temperature outside is higher than 32° F., the day thermostat 12 will call for heat later in the off period, increasing the off-on ratio. Whether and when the day thermostat 12 calls for heat during the off period is determined by the prevailing environmental factors, such as outside temperature, thermal efficiency of the structure, for example, how well the structure is insulated, and the efficiency of the system being controlled. In the event that the day thermostat 12 attempts to call for heat for the entire off period, the off-on ratio will be reduced to 1:1.

The remaining circuitry in FIG. 3 includes a bypass switch 35 (optional) which if desired may be utilized to disconnect the unit 10 from the system by short-circuiting the thermostat line, and a filter 45 which is a varister which acts as a short circuit for high voltage line transients caused by external sources and the actuation and deactivation of the system being controlled. Night thermostat 14 is connected to the heating system through two diacs Q7 and Q6, and a triac Q8 (AC switch) with the diacs Q7 and Q6 functioning to delay the actuation of triac Q8 for a small portion of the AC control signal from the heating system, in a similar manner to the function of diacs Q16 and Q17 and triac Q18 associated with the day thermostat 12.

A battery charging circuit is connected across the heating system line, and is comprised of a bridge rectifier CR8, CR9, CR10 and CR11, which converts the AC line voltage to a pulsating DC which is applied to an emitter follower Q1 and an amplifier stage Q2. The base of amplifier Q2 is connected through a resistor R4 to a zener diode CR6. A rechargeable nickel-cadmium battery 25 is connected through a resistor to an emitter follower Q1. The amount of charge applied to the battery 25 is determined by the zener diode CR6 along with the base to emitter bias voltage on amplifier Q2. Until the zener breakdown voltage of diode CR6 is approached, the battery 25 will charge full current rate, limited only by resistor R3. When the DC level of the battery 25 approaches the zener breakdown value, current begins to flow and turns on amplifier Q2. The higher the DC level of the battery 25 the more collector current flows to Q2 through resistor R2. The higher the current the lower the voltage level, and this voltage level biases the emitter follower Q1 whose output is directly proportional to its input, there being approximately 0.6 volts difference between the input and the output which is the emitter-to-base bias voltage. The output level from emitter follower Q1 determines the rate of charge on the battery, and the battery will stop charging when the output of the emitter follower Q1 is below the DC level of the battery voltage.

An AC line sensing circuit is coupled to the junction of rectifier CR8 and CR10 through a diode CR7 to a capacitor C1. The thermostat power line charges capacitor C1 through the diode CR7 acting as a peak detector circuit. The output of capacitor CR1 turns on the transistor switch Q4 to which it is coupled, whose output turns on the transistor switch Q3. Transistor switch Q3 applies battery potential to the front panel LED's CR1, CR2 and CR3, as well as portions of the on-off timer circuit. When the thermostat line is without power, no battery charging takes place, and any reduction in battery drain extends the battery stand-by time. Since this circuit will not be functioning, the fact that no indicating LED's on the front panel are on will indicate to the user that there is a problem with the heating system, and of course power will not be supplied to the on-off timer since there is no need to continue the on-off timing in the absence of power in the heating system. However, in the case of power outage, power is supplied by the battery 25 to the signal generator A4 and to the microprocessor A3 so that none of the programmed timing sequences are disrupted during power outages. Since the battery 25 provides power for maintaining the timing function, when the power is restored, the battery recharges, and the timing has not been disrupted. As has been pointed out, the system of the aforesaid patent totally disrupted the programming and required reprogramming to reset the proper timing sequences after power outages.

For illustrative purposes only, the following circuit components have been found suitable for use in the circuit of FIG. 3:

| Component | Type |
| --- | --- |
| A2 | MM 80C97N |
| A3 | MM 57160N |
| A4, A5 | MM 5369N |
| CR6 | 1N757A |
| CR7-11 | 1N4002 |
| CR12-24 | 1N914 |
| Q1, Q2 | 2N3642 |

-continued

| Component | Type |
| --- | --- |
| Q3, Q11 | 2N3645 |
| Q4, Q5, Q9, Q13-15, A19-21 | 2N3391 |
| Q7, Q8, Q16, Q17 | 2N4991 |
| Q8, Q18 | Q2003P3 |
| Q10 | 2N6028 |
| Q12 | 2N5060 |

In operation, the two input wires of the unit 10 are connected to the thermostat lines of the heating system. With the unit so connected, with no outputs programmed and no set times programmed, the unit is at zero time, and in the night mode, or under the control of the night thermostat 14. Accordingly, the unit may be operated under these conditions in the manner of any standard thermostatic system by merely setting the night thermostat to a desired temperature level.

To achieve fuel savings, the user may program the unit 10 and observe the timing or program status by pressing the display switch 22 as follows:

1. Depress the program time switch 24 which puts the unit in the programming mode awaiting the first time set.
2. Depress the hours and minutes buttons 30 and 32 respectively in accordance with the proper time for a mode change to occur.
3. Depress the mode set button 28 as many times as is necessary to select the proper mode to occur at the set time displayed.
4. Depress the program advance button 26 once, which selects the second set time.
5. Repeat steps 2 and 3.
6. Depress the program advance button 26 again, which selects the third time to be set.
7. Repeat steps 2 and 3.
8. Depress the program advance button 26 again, which selects the fourth time to be set.
9. Repeat steps 2 and 3.
10. If the program advance button 26 is depressed further, it will return to set time 1 and progress through the times set in sequence.
11. Depress the program time button 24 once, which will place the unit in the normal time keeping mode with the display showing the time of day.
12. Observing the front panel status of the light emitting diodes 27, depress the test button 34, which will cycle the real time clock at an accelerated rate, causing the mode changes to occur at the proper times. The test button 34 should be used to set to very nearly the current time of day, using the minute button to set the exact time, which should leave the unit 10 in the proper mode and at the proper time.
13. Set the day thermostat 12 to the normal daytime temperature, preferably no higher than 72° F.
14. Set the night thermostat 14 to the night setback temperature, preferably 10° below the daytime setting.
15. Set the system select control 16 to the proper setting for the type of system being used; for example, 1-3 for forced air, 4-6 for baseboard hot water, and 7-10 for steam. For most systems, mid-range will be ideal, i.e. 2 for hot air, 5 for hot water, and 8 for steam.

It will be apparent from the foregoing description that fuel economy and desired comfort levels are achieved with the present invention. The system provides an automatic environmental feedback which allows for the proper heat-up period when the system is first switched to the day thermostat, and subsequently to provide the proper on-off timing for the day thermostat. Furthermore, the night thermostat is never removed from the heating system control line, ensuring that the unit will at least maintain the night temperature setting, even in the event of improper programming or an error in programming by the user or with battery failure. Also, the battery stand-by provides up to 3½ hours of continued timing in case of power outages to the heating system, which prevents loss of the timing sequence when power returns to the line. The unit embodied in the present invention is also easy to install and to program. The unit is also inexpensive and economical based on realizable energy conservation.

Since other modifications and variations varied to fit particular operating requirements and environments will be apparent to those skilled in the art, the invention is not considered limited to the examples chosen for purposes of illustration, and covers all changes and modifications which do not constitute departures from the true spirit and scope of this invention.

What is claimed is:

1. An autocycling control circuit means for automatically controlling the activation of a heating system comprising, in combination,
   (a) first and second thermostat means, said second thermostat being set at a higher temperature than said first thermostat,
   (b) means for continuously coupling said first thermostat means to said heating system for continually maintaining a minimum temperature in accordance with the setting of said first thermostat, and
   (c) programmable timer means for selectively controlling the coupling of said second thermostat to said heating system during settable, predetermined time intervals,
   (d) said programmable time means including a control means coupled to said second thermostat for selectively enabling and disabling said second thermostat during said predetermined time intervals in accordance with whether said second thermostat is calling for heat.

2. The autocycling control circuit means set forth in claim 1 wherein said control means comprises a variable switch means for enabling and disabling said second thermostat and a feedback means coupled between said second thermostat and said variable switch means for changing the switching rate of said switch means in accordance with the condition of said second thermostat.

3. The autocycling control circuit set forth in claim 2 wherein said variable switch means comprises an oscillator whose frequency of oscillation is varied by said feedback means in accordance with the condition of said second thermostat.

4. The autocycling control circuit set forth in claim 1 having a stand-by battery supply coupled to said programmable timer means for maintaining the proper programmed timing sequence even in the absence of a line voltage from said heating system.

5. The autocycling control circuit set forth in claim 1 having a stand-by battery supply coupled to said programmable timer means and a battery charging circuit coupled to said battery for charging said battery when not in use.

6. The autocycling control circuit set forth in claim 1 having a signal generator coupled to said programmable timer means and a plurality of switches for setting the time intervals desired on said programmable timer means.

7. The autocycling control circuit set forth in claim 6 having a display means coupled to said programmable timer means for providing a visual display of the times set on said timer means.

8. The autocycling control circuit set forth in claim 7 whereby said display means is provided with a switch for activating said display means only when said switch is activated.

9. The circuit of claim 2 having a stand-by battery supply coupled to said programmable timer means for maintaining the proper programmed timing sequence even in the absence of a line voltage from said heating system.

10. The circuit of claim 2 having a stand-by battery supply coupled to said programmable timer means and a battery charging circuit coupled to said battery for charging said battery when not in use.

* * * * *

UNITED STATES PATENT OFFICE
CERTIFICATE OF CORRECTION

Patent No. 4,174,807     Dated November 20, 1979

Inventor(s) Arthur W. Smith and George D. Kimble

It is certified that error appears in the above-identified patent and that said Letters Patent are hereby corrected as shown below:

Column 5, line 6, after "This" insert -- again --.

Column 5, line 7, after "normally closed" insert -- (not calling for heat) --.

Column 5, line 18, change "21" to -- Q21 --.

Column 6, line 22, change "R31" to -- R32 --.

Column 6, line 29, change "15" to -- Q15 --.

Column 7, line 8, after "resistor" insert -- R3 --.

Column 7, line 8, change "an" to -- the --.

Column 7, line 32, change "CR1" to -- C1 --.

Sheet 2 of the drawings should be deleted to appear as per attachment.

Signed and Sealed this

Seventeenth Day of June 1980

[SEAL]

Attest:

SIDNEY A. DIAMOND

Attesting Officer     Commissioner of Patents and Trademarks